Patented Feb. 7, 1950

2,496,976

UNITED STATES PATENT OFFICE 2,496,976

TRANSPARENT WRAPPING FILMS OF 2,3-DICHLOROBUTADIENE COPOLYMERS

Arthur L. Barney, Wilmington, Del., assignor to E. I. du Pont de Nemours & Company, Wilmington, Del., a corporation of Delaware No Drawing. Application May 10, 1948, Serial No. 26,239

7 Claims. (Cl. 260—82.1)

This invention relates to wrapping films and more particularly to wrapping films having improved physical properties.

Transparent films composed of regenerated cellulose, cellulose esters, cellulose ethers, rubber derivatives, and other polymeric materials have achieved considerable commercial success as wrapping films because of certain characteristics such as transparency, flexibility, etc., which they possess. However, these materials are deficient in some characteristics required for use in particular applications. For example, regenerated cellulose films are water sensitive and have extremely high moisture permeability and therefore require the application of special moistureproof coatings to make them suitable for many uses. Other polymeric materials having inherently greater water resistance are deficient in other properties, such as flexibility, softening temperature, and particularly toughness. Therefore, wrapping films having exceptionally high toughness in combination with the other desirable properties of moisture resistance and impermeability and high ultimate strength are desired for use in wrapping articles subjected to drastic handling and storage conditions.

It is an object of this invention to provide wrapping films having improved physical properties. A further object of this invention is to provide clear, transparent, homogeneous and tough films of copolymers which are eminently suitable for wrapping films. A still further object is to provide wrapping films having high tear strengths in addition to toughness, water resistance and impermeability making them extremely useful for wrapping articles subjected to drastic handling and storage conditions. Another object is to provide wrapping films comprising a copolymer film supported on a regenerated cellulose film. Other objects will appear hereinafter.

These objects are accomplished by wrapping films of from 0.0001 to 0.010 inch in thickness comprising a copolymer of 2,3-dichloro-1,3-butadiene with another 1,3-diene, said copolymer containing from 85% to 96% of said dichlorobutadiene. It has now been found that wrapping films of this thickness comprising copolymers having these critical proportions of 85% to 96% 2,3-dichloro-1,3-butadiene with from 15% to 4% of other 1,3-dienes possess excellent toughness and a good balance of other desirable properties including clearness, transparency, high tear resistance and water impermeability. Since unsupported films of copolymers of 2,3-dichloro-1,3-butadiene with other 1,3-dienes in the above defined proportions possess a tear strength of at least 75 g. (determined as described below) at 0.015 inch thickness, the wrapping films of this invention are very suitable for use in wrapping articles which are subjected to drastic handling and storage conditions. The 2,3-dichloro-1,3-butadiene copolymers which are particularly valuable for use in wrapping films are copolymers containing the above-defined proportions of 2,3-dichloro-1,3-butadiene with 1,3-dienes having the general formula $CH_2=CXCH=CH_2$, wherein X is hydrogen, chlorine, or methyl.

The new wrapping films of this invention can be prepared from organic solvent solution or aqueous dispersion of the dichlorobutadiene/1,3-diene copolymers of the particular composition defined above. In the solvent casting method the copolymer of 2,3-dichloro-1,3-butadiene with another 1,3-diene is dissolved in a solvent such as xylene, dioxane, or tetrachloroethane by first stirring the pulverized copolymer in sufficient solvent to form a solution of from 5 to 20% concentration for a few minutes at room temperature to thoroughly wet the particles of the polymer. The exact concentration of solution to be prepared depends on the viscosity of the particular copolymer being used, i. e., copolymers of higher viscosity are used in the lower concentrations. The copolymer-solvent mixture is then stirred and heated to a temperature of at least 60° C. and preferably 100° C., until the polymer is in solution. The exact temperature selected depends on the boiling point of the particular solvent being used, since it is preferable to use a temperature below the boiling point of the solvent.

The resulting solution is allowed to stand at a temperature of above 50° C. until it is free from bubbles, whereupon it is cast onto a suitable support such as glass or polished metal plate or a metal drum which is maintained at a temperature just slightly, e. g., 5 to 10° C., lower than that of the solution in a uniform layer of sufficient thickness to form a dry film of between 0.0001 and 0.010 inch thickness. As the solvent evaporates from the wet film the temperature of the support is gradually increased to about 135° C., where it is held for 10 to 15 minutes to remove the last trace of solvent and to coalesce the copolymer into a homogeneous, transparent film. Hazy films are produced if the entire casting process is carried out at room temperature, and best results are obtained only with final temperatures above 125° C. The resulting film is cooled quickly, and then stripped from the support.

Various types of solvents are suitable for use in forming the solutions from which the films of this invention are cast. Examples of useful solvents include aromatic hydrocarbons such as benzene, toluene and xylene, halogenated hydrocarbons such as chlorobenzene and tetrachloroethane, nitro compounds such as nitrobenzene, cyclic ketones such as cyclohexanone, and cyclic ethers such as dioxane and tetrahydrofuran. The aromatic hydrocarbons are preferred since they have good solvent power for the copolymer and they are readily available at low cost.

In the preparation of the films of this invention from aqueous dispersions of the 2,3-dichloro-1,3-butadiene/1,3-diene copolymers a latex, i. e., an aqueous dispersion of the finely divided copolymer, containing 35 to 50% solids by weight, is spread uniformly on the surface of a smooth clean support, such as glass or metal, which is warmed to a temperature of 50–60° C. The latex is spread on the support by means of a spreader knife or other suitable means for obtaining a layer of the dispersion which, after drying, will form a solid film of 0.0001 to 0.010 inch thickness. Water is removed from the cast film by warming the film and support gradually until a final temperature of about 135° C. is obtained. The final heating at 135° C. is maintained until a transparent homogeneous film is formed, 10 to 15 minutes being required. The film is then cooled and stripped from the support.

In forming films on glass or metal supports it is preferable, in order to facilitate the removal of the film from the support, to either coat the support with a stripping agent prior to the casting of the film, or to include a small amount of such agent in the solution. Suitable stripping agents include long chain alcohols such as dodecyl, tetradecyl, and octadecyl alcohols, soya lecithin, dicetyl phosphate, and the like. A 1% solution of the stripping agent is suitable for coating the film support, and an amount of stripping agent ranging from 0.1 to 1% of the copolymer in the dispersion is suitable for incorporating in the casting solution or latex.

The copolymers of 2,3-dichloro-1,3-butadiene and another 1,3-diene used in the preparation of the films of this invention can be prepared by conventional polymerization techniques, such as the following. An aqueous solution containing about 4% of a dispersing agent such as the sodium salt of a long chain fatty alcohol sulfate and about 0.7% of an initiator such as potassium persulfate, is placed in a pressure reactor and cooled to 0° C. or lower. There is then introduced, under nitrogen, a mixture, also precooled to 0° C., of 2,3-dichloro-1,3-butadiene and the other 1,3-diene monomer in proportions required to produce a copolymer of the desired composition within the limits defined above. In general the proportion of dichlorobutadiene in the mixture of monomers is lower than the proportion of this comonomer in the copolymer which is formed. More specifically, the proportion of 2,3-dichloro-1,3-butadiene in the monomer mixture necessary to produce a high yield of homogeneous copolymer is about 95% for copolymers of about 96% dichlorobutadiene content, and about 75% for copolymers of about 85% dichlorobutadiene content. The total concentration of monomer mixture in the polymerization system ranges from 10 to 100% of the weight of the aqueous phase. Approximately 0.4%, based on the weight of the aqueous phase, of a 10% aqueous solution of sodium bisulfite is then added to the mixture as an activator, and the reactor is then swept out with nitrogen and closed. The reactor is agitated vigorously for one to two hours at 35–40° C. This is sufficient time for obtaining substantially complete, approximately 90%, conversion of the monomers to the copolymer. The resulting smooth latex containing from 5 to 50% of polymer solids is cooled and filtered through cheese cloth to remove traces of precoagulum, and any excess monomer is removed by evaporation.

When preparing concentrated latices, e. g. those of 40 to 50% polymer solids, it is desirable to include in the polymerization system a small amount of a protective colloid, e. g. 2 to 5% of a sulfonated naphthalene-formaldehyde condensation product.

Emulsion polymerization mixtures containing from 35 to 50% by weight of copolymer solids can be used directly to prepare the films of this invention by the latex casting method. However, for use in the solvent casting method the polymer must be coagulated from the latex. The copolymer can be coagulated and isolated by conventional methods. One such method which is suitable involves adding a salt and an acid e. g. sodium chloride and acetic acid, or a salt such as aluminum sulfate to the polymerization mixture. The coagulated copolymer is then washed and dried. The copolymer can also be coagulated from the latex by pouring the latex into a water-miscible organic solvent such as acetone or methanol, after which the coagulated polymer is washed with the water-miscible solvent and dried.

This invention is further illustrated by the following examples in which proportions of ingredients are expressed in parts by weight unless otherwise specified.

*Example I*

Ten parts of a copolymer of 2,3-dichloro-1,3-butadiene and 1,3-butadiene containing 92% of the dichlorobutadiene and having an intrinsic viscosity of 1.89 is uniformly wet with 90 parts of xylene at room temperature and then stirred at 100° C. until the copolymer is completely in solution. This solution is held at about 85° C. until it is free from bubbles, whereupon it is spread, at a temperature of 85° C., by means of a spreader knife on a polished metal plate warmed to 75–80° C., and previously coated with a 1% solution of dodecyl alcohol as a stripping agent. The temperature of the plate is gradually raised to 135° C. during 25 minutes as the xylene evaporates. The plate is then held at 135° C. for 10–15 minutes after all the xylene has left the film, after which it is cooled rapidly. The resulting homogeneous, transparent wrapping film of 0.0006 inch thickness has the following properties:

Tensile strength_____lb./sq. in__ 5,000
Elongation_____per cent__ 600
Pliability figure_____ 72
Water vapor permeability_____ 90
Tear strength_____grams__ 160

The physical properties of the films given herein are determined as follows: The tensile strength and elongation are determined on a Scott X–3 film testing machine at 25° C. and 50% relative humidity. The pliability figure is calculated by dividing $10^6$ by the modulus of elasticity at 1% elongation (taken from the tensile strength curve) and is expressed in inches squared per pound. The water vapor permeability is determined by a modification of ASTM method D697-42T which consists in measuring the amount of water vapor transmitted through a definite area of film from an atmosphere of 100% relative humidity to an atmosphere of 0% relative humidity at 39.5° C. The permeability value is expressed as grams of water per 100 sq. meters of film per 24 hours at 0-100% R. H. (53 mm. absolute water pressure), and is corrected to a standard film thickness of 0.001 in. The tear strength is determined by a modification of the Ellmendorf method as described in U. S. patent application Serial No. 564,893, filed November 3, 1944, now U. S. Patent No. 2,445,333. In this test the tearing strengths of films of different thicknesses are directly proportional to the squares of their thicknesses.

Example II

A wrapping film of 0.0016 inch thickness is prepared from a 10% solution in xylene of a copolymer of 2,3-dichloro-1,3-butadiene with 1,3-butadiene containing 94% of the dichlorobutadiene and having an intrinsic viscosity of 1.87 by the procedure of Example I. This film is also tough and transparent and has the following physical properties, which make it very suitable as a wrapping film:

| | |
|---|---|
| Tensile strength lb./sq. in | 5,000 |
| Elongation per cent | 1,000 |
| Pliability figure | 85 |
| Water vapor permeability | 70 |
| Tear strength grams | 1,300 |

Example III

A wrapping film of 0.0003 inch thickness is prepared in the manner described in Example I from a 10% xylene solution of a copolymer of 2,3-dichloro-1,3-butadiene with 2-chloro-1,3-butadiene containing 87% of the dichlorobutadiene. This film has the following properties:

| | |
|---|---|
| Tensile strength lb./sq. in | 2,500 |
| Elongation per cent | 400 |
| Pliability figure | 97 |
| Water vapor permeability | 100 |
| Tear strength grams | 55 |

Example IV

A wrapping film of 0.0016 inch thickness is prepared by the method of Example I from a 10% xylene solution of a copolymer of 2,3-dichloro-1,3-butadiene with isoprene (2-methyl-1,3-butadiene) containing 96% of the dichlorobutadiene. This film has the following properties:

| | |
|---|---|
| Tensile strength lb./sq. in | 5,000 |
| Elongation per cent | 600 |
| Pliability figure | 43 |
| Water vapor permeability | 35 |
| Tear strength grams | 120 |

Example V

A wrapping film of 0.0018 inch thickness is prepared by the method of Example I from a 10% xylene solution of a copolymer of 2,3-dichloro-1,3-butadiene with isoprene containing 90% of the dichlorobutadiene. This film has the following properties:

| | |
|---|---|
| Tensile strength lb./sq. in | 4,200 |
| Elongation per cent | 700 |
| Pliability | 54 |
| Water vapor permeability | 50 |
| Tear strength grams | 115 |

Example VI

A latex of a copolymer of 2,3-dichloro-1,3-butadiene with 1,3-butadiene containing 90% of the dichlorobutadiene, and containing 40% solids, is spread in a thin uniform film on a clean glass surface at atmospheric temperature. The water in this film is evaporated by means of a current of hot air. When the removal of the water is substantially complete, the film on the glass support is heated to at least 135° C. to coalesce the copolymer. The resulting thin film is clear and tough.

Although the above examples all deal with the preparation of unsupported films of the copolymers, the advantages inherent in these copolymers in film form can be realized in coatings on other materials. For example, a latex of a copolymer of 90% 2,3-dichloro-1,3-butadiene and 10% 1,3-butadiene is spread uniformly on a film of regenerated cellulose and the water removed by evaporation at an elevated temperature. The resulting transparent coated cellulose has greatly reduced permeability to water vapor.

The outstanding superiority of wrapping film comprising copolymers of 2,3-dichloro-1,3-butadiene with other 1,3-dienes containing 85 to 96% of the dichlorobutadiene is emphasized when the physical properties of such films are compared with those of wrapping films prepared from 2,3-dichloro-1,3-butadiene homopolymers and copolymers having compositions outside the above-defined limits. For example, a wrapping film of 0.0013 inch thickness prepared by the solvent casting method of a homopolymer of 2,3-dichloro-1,3-butadiene has a tensile strength of 5,000 lb./sq. in., an elongation of 500%, and water vapor permeability of about 30 but it has a tear strength of only 16 g. Such a low tear resistance precludes the use of this film for wrapping articles subjected to rough handling. On the other hand, copolymers of 2,3-dichloro-1,3-butadiene with other dienes containing less than 85% of the dichlorobutadiene are too soft and rubbery for use as wrapping films. More specifically, copolymers of 2,3-dichloro-1,3-butadiene with butadiene and isoprene containing 73% and 81%, respectively, of the dichlorobutadiene are even too soft and rubbery to strip from the supporting plate when they are cast by the solvent method.

The outstanding superiority of the wrapping films of this invention is also emphasized by the following comparative data on the properties of wrapping films made of typical commercial polymers. A vinyl chloride/vinylidene chloride copolymer wrapping film of 0.0014 inch thickness has a tensile strength of 7000 lb./sq. in. and a water vapor permeability of 10, but it has an elongation of only 30% and a tear strength of only 11. Likewise, a rubber hydrochloride wrapping film of 0.00125 inch thickness has a tensile strength of 4,850 lb./sq. in., an elongation of 400%, and a water vapor permeability of 130, but it has a tear strength of only 18.

Another unexpected characteristic of the copolymers of 2,3-dichloro-1,3-butadiene with other 1,3-dienes containing 85 to 96% of the dichlorobutadiene is their ability to form continuous, transparent, tough films from their aqueous dispersions or latices, thus making them suitable for wrapping articles subjected to drastic handling and storage conditions. It was formerly believed that aqueous dispersions of copolymers of this type containing more than 50% of the dichlorobutadiene would give only opaque, non-continuous films. Such films would obviously be unsuitable for use as wrapping films.

The examples have illustrated the use of three particular 1,3-dienes as the comonomers in the 2,3-dichloro-1,3-butadiene copolymers used in the practice of this invention. However, copolymers containing other 1,3-dienes in the above-defined proportions are also suitable, particularly 1,3-dienes having from 4 to 6 carbon atoms. Specific examples of such other 1-3-diene comonomers that can be used include 2,3-dimethylbutadiene, 3-fluoro-1,3-butadiene, 3-bromo-1,3-butadiene, 3-iodo-1,3-butadiene, 1-cyano-1,3-butadiene and 2-cyano-1,3-butadiene. Copolymers of 2,3-dichloro-1,3-butadiene with monomers other than the 1,3-dienes, e. g., vinyl monomers such as styrene, methyl methacrylate, methyl acrylate, acrylonitrile, vinyl chloride, vinylidene chloride and vinyl acetate, are not so useful in unsupported wrapping films as the diene copolymers. However, they are applicable in uses such as the coating of cellophane.

As many apparently widely different embodiments of this invention may be made without departing from the spirit and scope thereof, it is to be understood that this invention is not limited to the specific embodiments thereof except as defined in the appended claims.

I claim:

1. A transparent, tough wrapping film of from 0.0001 to 0.010 inch in thickness comprising a copolymer of 2,3-dichloro-1,3-butadiene with another 1,3-diene, said copolymer containing from 85% to 96% by weight of said dichlorobutadiene and from 15% to 4% by weight of said other 1,3-diene.

2. A transparent, tough wrapping film of from 0.0001 to 0.010 inch in thickness comprising a copolymer of 2,3-dichloro-1,3-butadiene with 1,3-butadiene, said copolymer containing from 85% to 96% by weight of said dichlorobutadiene and from 15% to 4% by weight of said 1,3-butadiene.

3. A transparent, tough wrapping film of from 0.0001 to 0.010 inch in thickness comprising a copolymer of 2,3-dichloro-1,3-butadiene with 2-chloro-1,3-butadiene, said copolymer containing from 85% to 96% by weight of said dichlorobutadiene and from 15% to 4% by weight of said 2-chloro-1,3-butadiene.

4. A transparent, tough wrapping film of from 0.0001 to 0.010 inch in thickness comprising a copolymer of 2,3-dichloro-1,3-butadiene with 2-methyl-1,3-butadiene, said copolymer containing from 85% to 96% by weight of said dichlorobutadiene and from 15% to 4% by weight of said 2-methyl-1,3-butadiene.

5. A transparent, tough, water-resistant wrapping film of from 0.0001 to 0.010 inch in thickness comprising a copolymer film supported on a regenerated cellulose film, said copolymer film containing from 85% to 96% by weight of 2,3-dichloro-1,3-butadiene and from 15% to 4% by weight of another 1,3-diene.

6. A transparent, tough wrapping film of from 0.0001 to 0.010 inch in thickness comprising a copolymer of 2,3-dichloro-1,3-butadiene with another 1,3-diene having from 4 to 6 carbon atoms, said copolymer containing from 85% to 96% by weight of said dichlorobutadiene and from 15% to 4% by weight of said other 1,3-diene.

7. A transparent, tough, water-resistant wrapping film of from 0.0001 to 0.010 inch in thickness comprising a copolymer film supported on a regenerated cellulose film, said copolymer film containing from 85% to 96% by weight of 2,3-dichloro-1,3-butadiene and from 15% to 4% by weight of 1,3-butadiene.

ARTHUR L. BARNEY.

REFERENCES CITED

The following references are of record in the file of this patent:

UNITED STATES PATENTS

| Number | Name | Date |
|---|---|---|
| 1,965,369 | Carothers et al. | July 3, 1934 |